INVENTOR
MELVIN W. ARSOVE
AGENT

INVENTOR
MELVIN W. ARSOVE
BY Carole M. Calman
AGENT

INVENTOR
MELVIN W. ARSOVE

United States Patent Office 3,344,420
Patented Sept. 26, 1967

---

3,344,420
DATA COLLECTION SYSTEM
Melvin W. Arsove, Wayland, Mass., assignor to Raytheon Company, Lexington, Mass., a corporation of Delaware
Filed Feb. 5, 1965, Ser. No. 430,635
14 Claims. (Cl. 343—6.5)

ABSTRACT OF THE DISCLOSURE

An information system comprising a plurality of randomly-located sources of data signals each including a respective transponder means and radar system for propagating interrogation signals to the sources, and for receiving the data signals and extracting data information contained in the data signals from each individual transponder separately and extracting range and bearing information by relating the data signals to the interrogation signals.

---

This invention is concerned with a data collection system and more particularly with a system capable of providing data concerning objects within the ocean or data pertaining to the ocean itself.

A need exists today in the field of oceanography for an economical system capable of providing the synoptic data required to predict at sea weather conditions so that ships may be routed more effectively. Although it is well known that a great circle sailing route is the shortest distance between two points on the earth, a ship's route will be much shorter in respect to time if it is longer in distance but avoids such things as head winds and high seas caused by inclement weather. In addition to the savings in time, expensive damage to the ship's cargo and discomfort to the ship's passengers due to storms are avoided. One variable which enters into the prediction of weather is that of temperature of the ocean at the surface and at various depths. For a proper prediction it should be measured at many locations over a very large ocean area. Consequently, a data collection system which provides practically synoptic information about ocean temperatures has a high degree of utility in the art of weather prediction at sea and, it should be noted, over the land masses.

Another data collection system having particular utility in the fields of commercial fishing and marine biology is one capable of listening to the sounds emitted by fish and other creatures of the sea. It is well known that noise of biological origin occurs in the oceans at frequencies ranging from 10 cycles per second to above 100 kilocycles per second. See, for example, Acoustic Ambient Noise in the Ocean; Spectra and Sources by Gordon M. Wenz, Journal of the Acoustical Society of America, vol. 34, 1962. Moreover, each species emits characteristic sounds which differ from those of other species in that the intensity of the sound varies with frequency in a characteristic manner for each species. Consequently, a data collection system which provides information about the acoustic noises in the ocean has a high degree of utility in locating particular species of fish for commercial fishing and in studying the behavior of these species during their life cycle.

A further data collection system known in the art is an acoustic identification system wherein a plurality of sonobuoys are strewn over the surveillance area, each buoy having a simple radio transmitter operating on a different transmitting frequency than every other one. Each buoy with its known radio transmitting frequency is placed on the ocean surface in a location which is known relative to all the other buoys in the surveillance area. As long as the relative positions of the buoys are not altered by the action of current, wind, and waves, the receipt of acoustic data on a particular frequency can be uniquely and unambiguously identified as coming from a specific buoy in the pattern of buoys. Clearly, the useful lifetime of such a system is short when there are winds, waves, or currents present which alter the relative positions of the buoys in the pattern. Also, such a system becomes extremely expensive and complicated as the number of buoys in the pattern is increased. Moreover, when a large number of buoys are used, it is conceivable that there may not be enough radio frequency bands available to accommodate all of the transmitting frequencies required. Additionally, the transmitters are not ideal for mass production since provisions must be made so that each buoy in the pattern can operate on a different frequency.

Accordingly, a primary object of the present invention is to provide an improved system for large scale data collection which is simple, compact in size, and lends itself to low-cost mass production techniques.

A further object of the invention is to provide an improved oceanographic surveillance system capable of providing synoptic data over vast ocean regions.

A further object of the invention is to provide an improved sonobuoy system and, more particularly, one which is highly flexible and which has a long useful lifetime irrespective of drastic changes in the relative positions of the buoys in the surveillance field.

A still further object of the invention is to provide a system which detects objects and provides data thereon.

These and related objects are accomplished in one embodiment of the invention by an ocean temperature surveillance system comprising an airborne, pulse-type, beam radar and a large plurality of buoys which float freely on the ocean in a selected area. Each buoy contains both a thermometer for sensing ocean temperature and providing a signal which is a single value function thereof, and a transponder which in response to illumination by the interrogation pulse of energy from the radar radiates signals displaced in frequency from the interrogation signal by an amount which depends on the magnitude of the thermometer signal. Thus, temperature data is detected by the radar as an offset in frequency, and the length of time from the emission of the interrogation signal to the receipt of the buoy response signal provides a precision measurement of buoy range. Moreover, the bearing of the buoy with respect to a reference direction is obtained from knowledge of the bearing of the narrow radar beam at the time the transponder in the buoy is illuminated.

Other objects, features, and applications of the invention will be apparent from the following description of a preferred embodiment and reference to the accompanying drawings, wherein.

Figure 1:
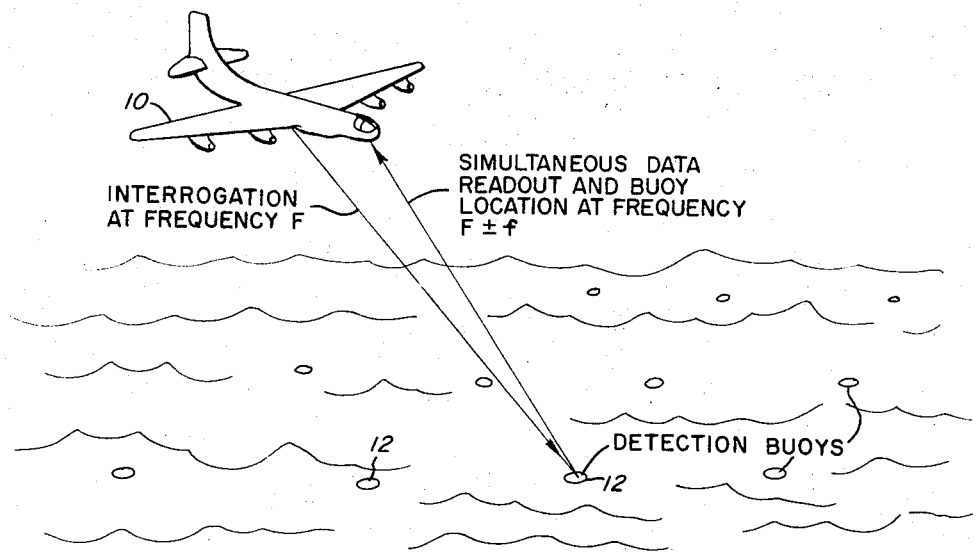
FIG. 1 is a diagram representing the system under actual operating conditions.

FIG. 1 shows the invention under actual operating conditions and comprises an airplane 10 containing a beacon radar system, and a large plurality of small, lightweight buoys 12 scattered randomly over the top of the ocean area under surveillance. Each buoy contains a thermometer for measuring ocean temperature, and a transponder for receiving an interrogation signal when the buoy is illuminated by the radar, and in response thereto radiates a signal providing temperature information. Upon receipt of this radiated signal, the radar processes the temperature data and, in addition, computes the range of the buoy by well-known radar techniques based on the elapsed time from the emission of the interrogation signal to the receipt of the transponder response. Thus, the response signal from the transponder provides both temperature information and buoy position information which are needed for temperature mapping of the ocean area.

Figure 2:
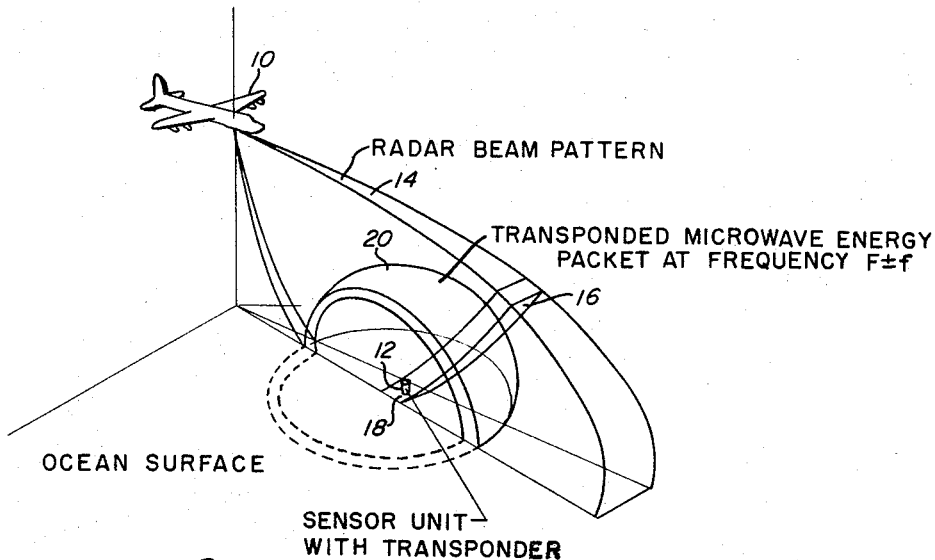
FIG. 2 is a diagram of a buoy being interrogated by an airborne beam radar.

The beacon radar within airplane 10 is a conventional device which has been extensively published in the literature of the radar art. For instance, a description of a suitable radar which is incorporated by reference herein may be found in the basic radar treatise by Arthur Roberts, entitled Radar Beacons, published by McGraw-Hill Book Company, Inc. in 1947. FIG. 2 shows the manner in which such a radar located within airplane 10 operates to obtain data from any buoy 12. Briefly, the radar functions in a normal search mode with its beam scanning and having no prior knowledge of buoy position. When a pulse is emitted from the radar, a radar beam pattern 14 is formed. The packet of microwave energy 16 propagating away from airplane 10 illuminates and intersects the sea surface to produce a scanning area 18 that sweeps out a narrow sector whose angular width depends on the aircraft altitude, the antenna pattern of the radar and the depression angle of the antenna axis below the horizontal. During the time that a particular buoy 12 is within scanning area 18, the microwave energy from the radar operates a transponder inside the buoy 12 which emits a packet 20 of microwave energy in all directions at frequencies $F \pm f$ without delay. Frequency F is equal to the incident interrogation radar frequency received by buoy 12, and frequency $f$ corresponds to the temperature data detected by the buoy thermometer. The manner in which packet 20 is produced will be described later in detail with reference to FIG. 3. The transponder signal is received by the radar, after which its temperature data is processed and at the same time the transmitting buoy's position relative to airplane 10 is determined by standard radar techniques, so that airplane 10 does not require any prior knowledge about the location or identity of the buoy 12 being interrogated. The position of buoy 12 is therefore computed from the lapse in time between the emission of the radar pulse and the receipt of the transponder signal by the radar.

Figure 3:
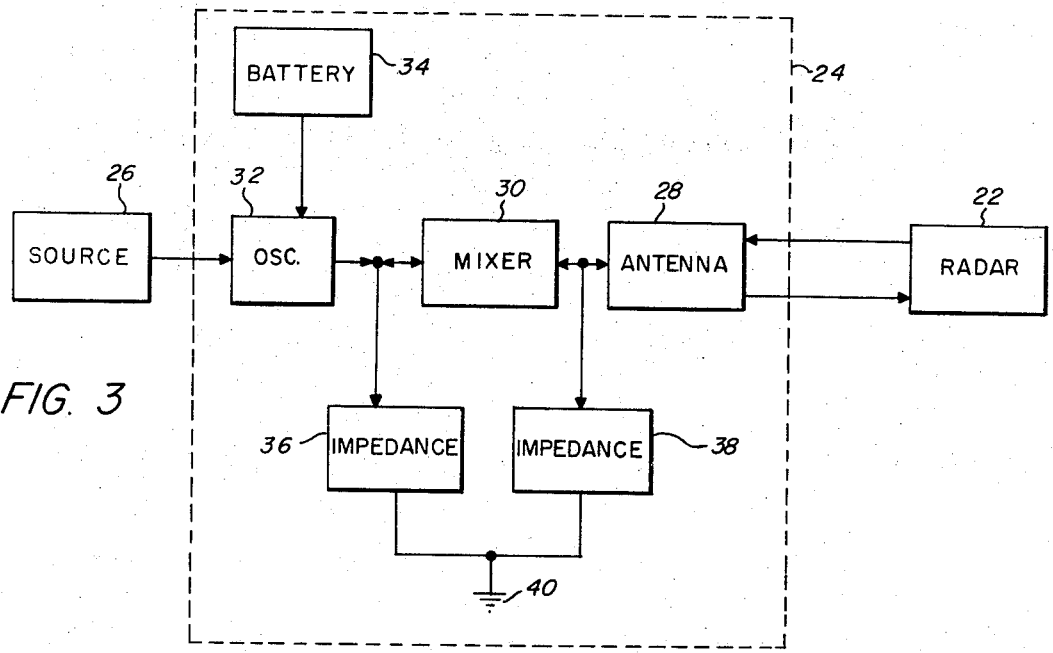
FIG. 3 is a block diagram of the radar and buoy circuits including a transponder and thermometer sensor.

FIG. 3 is a block diagram of the radar 22 located in airplane 10 interrogating the electronic circuits located within one of the buoys intercepted by its beam. These electronic circuits comprise a transponder 24 and a temperature sensor or information source 26. Upon receipt of an interrogation signal from radar 22, transponder 24 radiates in response thereto signals whose frequency is displaced from that of the radar interrogating signal by an amount which is a single-valued function of the output signal from sensor 26. Thus, the frequency offset of the transponder radiated signals represents temperature data and is displayed as such at the radar, as will be described later.

The transponder is represented by numeral 24 in FIG. 3 and comprises a crystal diode mixer 30, such as the commercially available 1N21, connected between an antenna 28 and a voltage controlled, variable frequency oscillator 32 which is energized by battery 34. Impedance element 36, which may comprise for instance a radio frequency by-pass capacitor, provides a low impedance path to ground reference potential source 40 for radio frequency signals, and a high impedance path for intermediate frequency signals. Conversely, impedance element 38 which may comprise a radio frequency choke, for example, provides a high impedance path to ground 40 for radio frequency signals, and a low impedance path for intermediate frequency signals and direct current. Oscillator 32 is a voltage controlled oscillator whose output frequency is determined by the magnitude of voltage applied to it by sensor 26. Any one of the well-known voltage-controlled variable frequency oscillators may be used, such as one whose tank circuit includes a variable capacitor whose capacitance varies with applied voltage, for instance, the commercially available HC7002 capacitor. The frequency of oscillator 32, therefore, varies with the bias voltage impressed on it by sensor 26 and thus varies with temperature.

Transponder 24, upon receipt of an interrogation signal from radar 22, immediately reradiates signals which are shifted in frequency from the interrogation signal by an amount determined by the information from temperature sensor 26. Transponder response signal is selectively chosen such that it is offset from the incident radar signal frequency by an amount which places its response just outside the clutter spectrum, when the response signal, representative of temperatures, is such that it is outside the representative range of temperatures likely to be measured by the sensor 26. Therefore, when the reply from transponder 24 is received by radar 22, it does not have to compete with large clutter signals so that the power in the transponder response can be substantially less than would be needed for the same range performance if there was no frequency offset. Consequently, oscillator 32 can be a low power oscillator and will operate for a long time when powered by a small battery 34.

Sensor 26 is a thermometer comprising any well-known bridge circuit having in at least one of its branches a thermistor device responsive to temperature changes so that its output voltage varies with temperature. The output voltage signal from sensor 26 is applied to variable frequency oscillator 32 whose frequency output is a single-valued function of that signal.

When an interrogation signal is received from radar 22 by transponder 24, it passes through antenna 28, mixer 30, low impedance means 36 to ground reference source 40. At the same time that the antenna signal is applied to mixer 30, a signal from oscillator 32, having its frequency dependent on temperature, passes through mixer 30 and low impedance means 38 to ground 40. Mixer 30 immediately upon receipt of a signal from both oscillator 32 and antenna 28 combines these signals and without delay produces sidebands about the antenna signal which are shifted in frequency from the radar interrogation signal by an amount proportional to the output frequency of oscillator 32. Since the frequency of the output from oscillator 32 depends upon the temperature data from sensor 26, the frequency of the mixer sidebands carry temperature data. Antenna 28 thereupon radiates the mixer response signals which are subsequently received by radar 22 and processed in a manner which will be explained with reference to FIG. 6.

Figure 4:
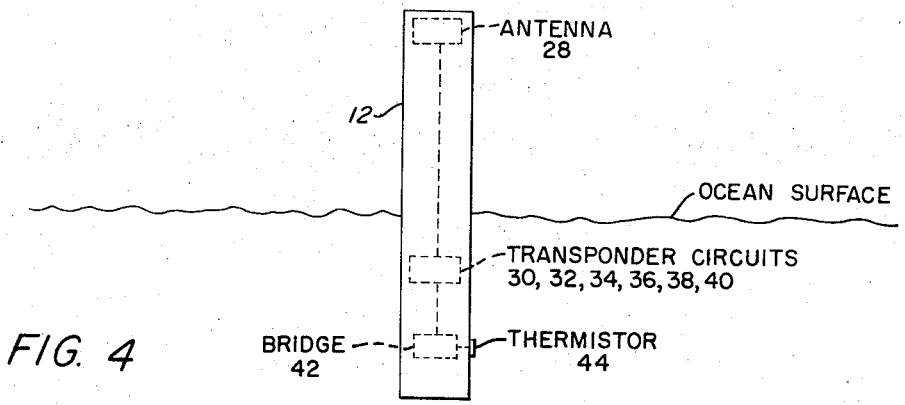
FIG. 4 is a diagram showing a suitable buoy for use in the surveillance system of the invention.

FIG. 4 shows a suitable elongated buoy 12 together with the circuits comprising transponder 24 and sensor 26. Transponder 24 is depicted by a block representing antenna 28 and another block representing mixer 30, oscillator 32, battery 24, impedance means 36 and 38, and reference potential source 40. Sensor 26 is depicted by bridge 42 and thermistor 44. Antenna 28 is located at the top of the buoy so that it may receive the interrogation signal and radiate the transponder signal. The remaining circuits of transponder 24 are placed in the buoy at a level below the ocean surface for weighting purposes. Similarly, sensor 26 comprising bridge 42 and thermistor 44 are also located below the ocean surface. Thermistor 44 is located on the outer surface of buoy 12 which may be accomplished by mechanical attachment or printing techniques. It may be placed anywhere along the buoy surface depending upon the depth at which the water temperature is to be measured. Although the sensor 26 shown measures temperature at or near the ocean surface, it should be appreciated that the invention is not limited thereby. The sensor 26 could be suspended on a cable extending from the buoy 12 to the desired depth. Furthermore, this invention is not limited to a single sensor, as many sensors could be used which time share the transponder 24 using a time sharing technique.

Figure 5:
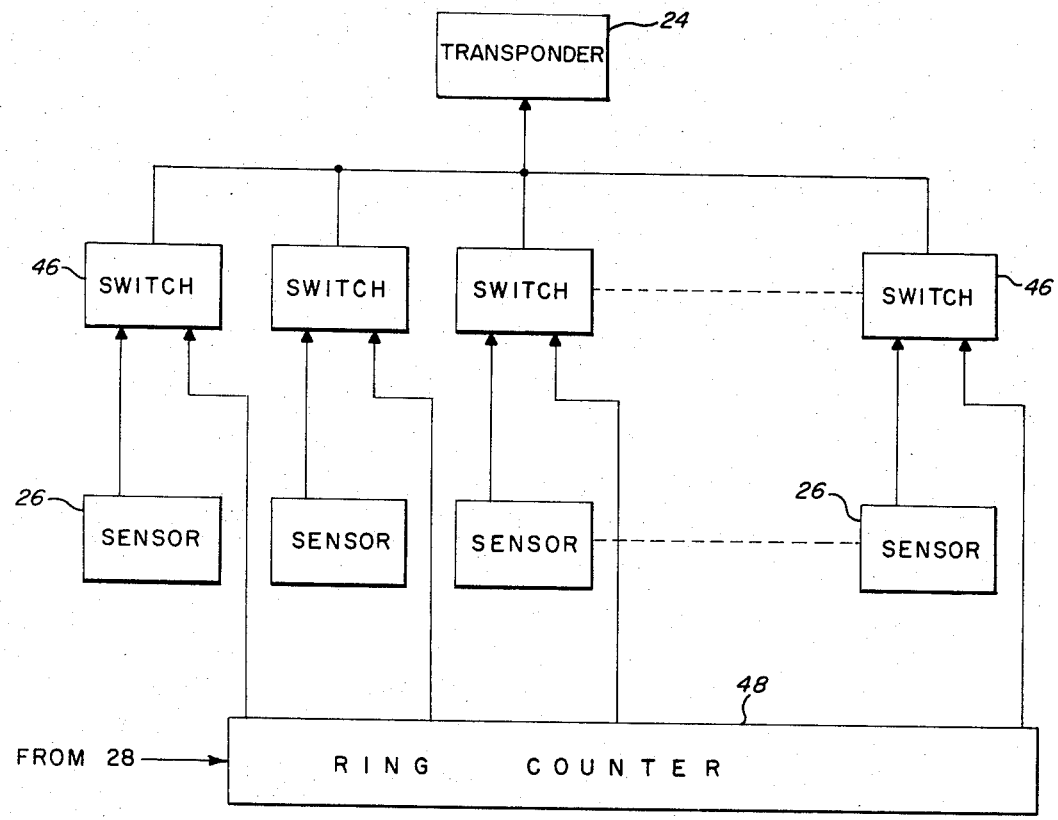
FIG. 5 is a block diagram of a means for time sharing a plurality of temperature sensors.

An example of a plurality of sensors 26 time sharing a buoy transponder 24 is shown in FIG. 5. Each sensor 26 is connected to a respective switch 46, all of which switches are connected to a well-known ring counter 48. Each interrogation pulse from antenna 28 steps the ring counter 48 one place, which opens one of the switches 46 allowing the signal from its associated sensor 26 to pass through to the transponder 24. Thus, temperature may be measured at a plurality of different depths and the data produced transmitted to radar 22 as transponder signals, where they are processed and used to predict weather.

Figure 6:
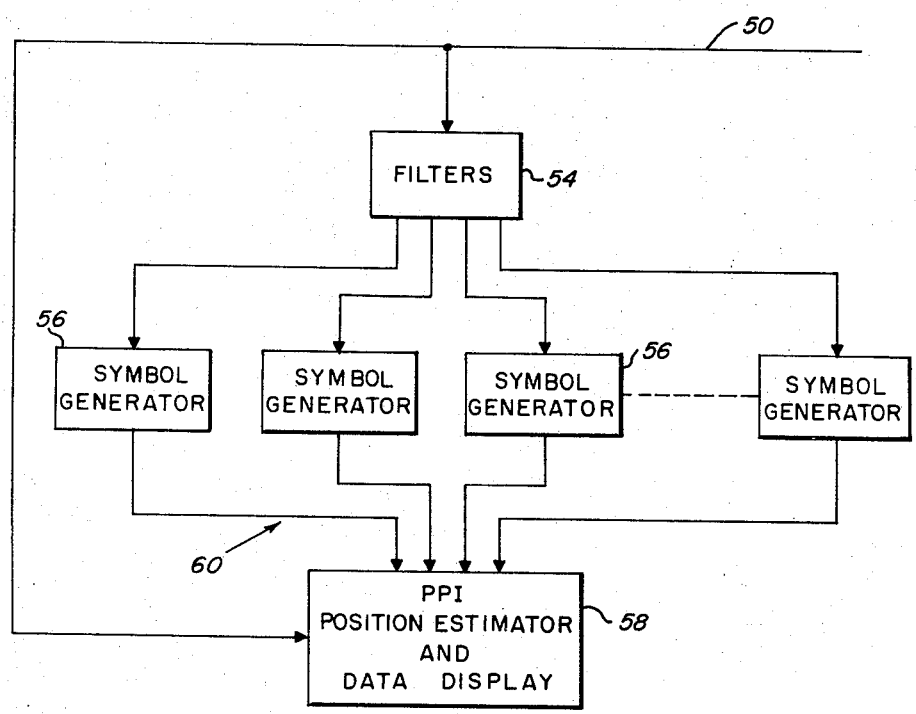
FIG. 6 is a diagram of the data processing portion of the radar.

The data processing portion of the radar 22 is depicted in FIG. 6 and comprises a combined position estimator and data display 58 for determining the range and bearing of the particular buoy 12 interrogated and the temperature data of that buoy. The PPI display 58 receives the transponder signal via line 50 and, using well-known radar circuit techniques, produces a bright spot on the cathode ray tube of the PPI at a position corresponding to the polar coordinates of the buoy 12 as determined from the bearing of the axis of the radar beam and from the time lapse between the emission of the interrogation signal and the receipt of the transponder signal.

Temperature data display system 60 comprises a filter 54 connected to a plurality of symbol generators 56, which drive a PPI display 58. The transponder signal when received on line 50 is also applied to filters 54 comprising a bank of individual filters, which may include, for example, a plurality of L-C tank circuits, each being responsive to a different frequency band. Thus, a signal is emitted on only one filter output line depending upon which filter in the filter bank 54 passes the transponder signal, and this in turn activates one of the symbol generators 56. In response thereto, the activated symbol generator 56 transfers a symbol, such as a number descriptive of the temperature data, to PPI display 58, adjacent to the bright spot on the PPI which gives the buoy position. Symbol generator 56 may be any one of the commercially available generators, such as the Raytheon Character Generator for Digital Information Display System 500, which emits a numerical character in response to a signal on its input. The displayed data and position information may then be used for plotting a temperature map for use in predicting at-sea weather.

Although the invention has been described in a preferred embodiment as an ocean temperature sensing system, it should be appreciated that this is by way of illustration and not limitation. For instance, the invention is also an object surveillance system when a pressure sensitive acoustic transducer, or displacement hydrophone, etc. is used as sensor 26. Through the use of such devices, information on such things as fish, ships, submarines, etc. may be transmitted to radar 22. Additionally, it is not limited to the ocean itself or objects within the ocean, since from the foregoing description it would be obvious to anyone skilled in the art to use the system for interrogating a plurality of transponders located on land or in the air. The buoys may also include devices for transmitting signals which will be reflected by passive elements such as rocks, icebergs, etc. and detected by the sensors. Consequently, the invention should be given the full scope of the following claims.

What is claimed is:
1. An ocean data system for sensing information-bearing signals in a multiplicity of buoys in a particular ocean area and transmitting data signals representative of said information and position information comprising:
   a multiplicity of freely floating buoys scattered over the top of said ocean area;
   a radar system operative in a search mode for propagating interrogation signals and in a receive mode for receiving said data signals, and producing therefrom said buoy position information and extracting information contained in said data signals;
   each of said buoys containing a plurality of sensing means for sensing said information-bearing signals and producing signals being a single-valued function of said information, transponder means for producing data signals in response to said interrogation signals and being offset in frequency therefrom by an amount which is a single-valued function of said information, time sharing means connected between said plurality of sensing means and said transponder including a sequential means connected to a plurality of switching means, said sequential means operative to selectively open one of said switches, and radiating means connected to said transponder for radiating said data signals.

2. An ocean data collection system for sensing information-bearing signals in a multiplicity of buoys in a particular ocean area and transmitting data signals representative of said information and position information, comprising:
   a multiplicity of freely floating buoys scattered over the top of said ocean area;
   a radar system operative in a search mode for propagating interrogation signals and in a receive mode for receiving said data signals and producing therefrom said information and buoy position information, said radar system including a plurality of frequency discriminating means for selectively passing said data signals, a display means for displaying said information and said buoy position information, and a plurality of data generators connected between said filters and said display for producing a visual representation of said data;
   each of said buoys containing a plurality of sensing means for sensing said information-bearing signals and producing signals being a single-valued function of said information, transponder means for producing data signals in response to said interrogation signals and being offset in frequency therefrom by an amount which is a single-valued function of said information, time sharing means connected between said plurality of sensing means and said transponder including a sequential means connected to a plurality of switching means, said sequential means operative to selectively open one of said switches, and radiating means connected to said transponder for radiating said data signals.

3. An information system, comprising:
   a plurality of randomly-located sources of data signals each including a respective transponder means; and,
   a radar system for propagating interrogation signals to said sources, and for receiving said data signals and extracting data information contained in said data signals from each individual transponder separately and extracting range and bearing information by relating the data signals to the interrogation signals.

4. An information system, comprising:
   a plurality of randomly-located sources of data signals;
   a radar system for propagating interrogation signals to said sources, and for receiving said data signals and extracting data information contained in said data signals and extracting range and bearing information by relating the data signals to the interrogation signals;

each of said sources including a respective transponder means for producing said data signals by offsetting in frequency said interrogation signals by an amount determined by said information.

5. A system operative to produce and process data signals from a source, comprising:

a source of said data signals;

a radar system for propagating interrogation signals, and for receiving said data signals from said source, producing therefrom source position information and extracting data information contained in said data signals and extracting range and bearing information by relating the data signals to the interrogation signals;

said source including receiver means for receiving said interrogation signals, a source of information-bearing signals, and means connected to said receiver means and said source of information-bearing signals for producing said data signals displaced in frequency from said interrogation signals by an amount which is a single-valued function of said information-bearing signals.

6. A system for sensing information-bearing signals in a multiplicity of portions of a particular area and transmitting data signals representative of said information, comprising:

a multiplicity of sensing means each located in a different area portion for sensing said information-bearing signals;

a radar system operative in a search mode for propagating interrogation signals and in a receive mode for receiving said data signals and producing therefrom sensed information and sensing means position information; and, a multiplicity of transponders each connected to one of said sensing means for producing a data signal in response to one of said interrogation signals being shifted in frequency from said interrogation signal by an amount determined by said sensed information signal and means for radiating said data signal.

7. A system for sensing information-bearing signals in a multiplicity of portions of a particular area and transmitting data signals representative of said information and position information, comprising:

a multiplicity of sensing means each located in a different area portion for sensing said information-bearing signals;

a radar system operative in a search mode for propagating interrogation signals and in a receive mode for receiving said data signals and producing therefrom said sensed information and sensing means position information; and, a multiplicity of transponders each connected to one of said sensing means including means for producing at least one data signal in response to one of said interrogation signals being shifted in frequency from said interrogation signal by an amount determined by said sensed information signal and means for radiating said data signal.

8. An ocean data system for sensing information-bearing signals in a multiplicity of buoys in a particular ocean area and transmitting data signals representative of said information and position information, comprising:

a multiplicity of buoys scattered over said ocean area;

a radar system operative in a search mode for propagating interrogation signals and in a receive mode for receiving said data signals, and producing therefrom buoy position information and extracting data information contained in said data signals and extracting range and bearing information by relating the data signals to the interrogation signals;

each of said buoys containing a sensing means for sensing said information-bearing signals and producing signals being a single-valued function of said information, and transponder means connected to said sensing means for producing data signals in response to said interrogation signals, said transponder signals being shifted in frequency from said interrogation signals by an amount which is a single-valued function of said information.

9. The invention according to claim 8 and wherein:

each of said transponders comprises a variable tunable oscillator for producing a signal having a frequency which is a single-valued function of said information and a mixer means connected to said oscillator for mixing said oscillator signal with one of said interrogation signals.

10. An ocean data collection system for sensing information-bearing signals in a multiplicity of buoys in a particular ocean area and transmitting data signals representative of said information and position information, comprising:

a multiplicity of freely floating buoys scattered over the top of said ocean area;

a radar system operative in a search mode for propagating interrogation signals and in a receive mode for receiving said data signals and producing therefrom said information and buoy position information, said radar system including a plurality of differently tuned filters for selectively passing said data signals, a PPI display means for displaying said information and said buoy position information, and a plurality of symbol generators connected between said filters and said PPI display for producing a visual representation of said data;

each of said buoys containing a plurality of sensing means for sensing said information-bearing signals and producing signals being a single-valued function of said information, transponder means including semiconductor mixing means for producing data signals in response to said interrogation signals and being offset in frequency therefrom by an amount which is a single-valued function of said information, time sharing means connected between said plurality of sensing means and said transponder including a ring counter connected to a plurality of switching means, said ring counter being operative to selectively open one of said switches, and antenna radiating means connected to said transponder for radiating said data signals.

11. An ocean data system for sensing information-bearing signals in a multiplicity of buoys in a particular ocean area and transmitting data signals representative of said information and position information, comprising:

a multiplicity of freely floating buoys scattered over said ocean area;

a radar system operative in a search mode for propagating interrogation signals and in a receive mode for receiving said data signals and producing therefrom said information and buoy position information;

each of said buoys containing a plurality of sensing means connected in time sharing relationship for sensing said information-bearing signals and producing signals being a single-valued function of said information, transponder means connected to all of said sensing means for producing data signals in response to said interrogation signals, and transponder signals being shifted from said interrogation signals by an amount determined by said information, and radiating means connected to said transponder for radiating said data signals.

12. The invention according to claim 11 and wherein: at least some of said plurality of sensing means in one of said buoys being located at different heights.

13. The invention according to claim 11 and wherein: at least some of said plurality of sensing means in one of said buoys comprise ocean sensing means being located at different depths.

14. The invention according to claim 11 and wherein: at least one of said plurality of sensing means in one of said buoys being located above the surface of said ocean.

References Cited

UNITED STATES PATENTS 3,183,478   5/1965   Slawsky et al. _____ 340—2
3,229,684   1/1966   Nagumo _____ 128—2

OTHER REFERENCES

Weinstein: "How FM was Used to Find Submarines," In FM and Television, May 1946, pp. 22–24, 48 and 57 relied on.

RODNEY D. BENNETT, *Primary Examiner.*

D. C. KAUFMAN, *Assistant Examiner.*